United States Patent
Inagaki et al.

[11] Patent Number: 5,836,080
[45] Date of Patent: Nov. 17, 1998

[54] POSITIONING TABLE

[75] Inventors: Noriyuki Inagaki, Osaka; Toru Hattori, Neyagawa, both of Japan

[73] Assignee: Matsushita Electric Industrial Co., Ltd., Osaka-Fu, Japan

[21] Appl. No.: 582,314

[22] Filed: Jan. 3, 1996

[30] Foreign Application Priority Data

Jan. 12, 1995 [JP] Japan .................................. 7-003480

[51] Int. Cl.$^6$ .................................................. B23Q 1/25
[52] U.S. Cl. .......................... 33/1 M; 33/568; 108/140
[58] Field of Search ........................... 33/1 M, 568, 573, 33/577; 359/391, 392, 393; 108/20, 137, 139, 140; 248/913; 269/73

[56] References Cited

U.S. PATENT DOCUMENTS

| | | | |
|---|---|---|---|
| 4,126,376 | 11/1978 | Gommel et al. | 359/393 |
| 4,575,942 | 3/1986 | Moriyama | 33/1 M |
| 4,610,442 | 9/1986 | Oku et al. | 269/73 |
| 5,029,791 | 7/1991 | Ceccon et al. | 359/393 |
| 5,031,547 | 7/1991 | Hirose | 33/1 M |
| 5,180,975 | 1/1993 | Andoh et al. | 33/573 |

FOREIGN PATENT DOCUMENTS

| | | |
|---|---|---|
| 4-9379 | 2/1992 | Japan . |
| 4-81211 | 12/1992 | Japan . |
| 6-180381 | 6/1994 | Japan ...................................... 108/20 |

*Primary Examiner*—Diego F. F. Gutierrez
*Assistant Examiner*—Andrew Hirshfeld
*Attorney, Agent, or Firm*—Wenderoth, Lind & Ponack, L.L.P.

[57] ABSTRACT

A positioning table includes a table member having a load plane, a supporting device for movably supporting the table member within a plane parallel to the load plane and, first, second, and third slide blocks located around the table member in a freely movable fashion toward and away from the table member. The first and second slide blocks move in directions parallel to each other, and the third slide block moves in a direction perpendicular to the moving directions of the first and second slide blocks. First, second, and third rollers project from a peripheral edge of the table member and are rotatable about axes perpendicular to the load plane. The first, second, and third slide blocks are pressed into contact with the corresponding first, second, and third rollers, and the first, second, and third rotary cams abut against the corresponding first, second, and third slide blocks at opposite sides to where the first, second, and third slide blocks are respectively pressed into contact with the first, second, and third rollers.

20 Claims, 5 Drawing Sheets

POSITIONING TABLE

BACKGROUND OF THE INVENTION

The present invention relates to a positioning table for use in positioning/registering of wafers with a pattern mask in an exposure process during the manufacture of semiconductors or in like occasions.

A strong demand has been aroused for the positioning tables to be not only highly accurate, but compact, lightweight, and cost-saving while exerting high speeds.

A positioning table of the aforementioned kind is disclosed, for example, in Japanese Patent Publication No. 4-81211, which will be described hereinbelow with reference to FIGS. 4–6. In the drawings, 11 is a base plate, 12 is a lower table, and 13 is an upper table. The lower table 12 is fixed onto the base plate 11. The upper table 13 is placed over the lower table 12 via three ball groups 14a, 14b, and 14c. These three ball groups are separated a suitable distance from each other by retainers (15a, two retainers similar to retainer 15a but which are not shown, and 16). The lower table 12 and three ball groups 14a, 14b, 14c work to so support the upper table 13 as to be movable within one plane.

The upper table 13 has rollers 19a, 19b and 19c fitted thereto by brackets 17a, 17b, 17c, and pins 18a, 18b, 18c. The rollers 19a, 19b, 19c are rotatable about the corresponding pins 18a, 18b, 18c.

Meanwhile, guide blocks 20a, 20b and 20c are fixed onto the base plate 11, to which wedge blocks 22a, 22b and 22c are slidably mounted via slide guides (21a, 21b and a third slide guide similar to slide guides 21a and 21b but which cannot be seen in the drawings). Shafts of ball screws 24a, 24b, 24c and pulse motors 25a, 25b, 25c constituting driving means 23a, 23b, 23c for the wedge blocks 22a, 22b, 22c are secured to each other by means of connectors 26a, 26b, 26c. The ball screws 24a, 24b, 24c are set with respect to the guide blocks 20a, 20b, 20c via bearings 27a and two bearing similar to bearing (27a but which cannot be seen in the drawings) and brackets 28a, 28b, 28c, and similarly, pulse motors 25a, 25b, 25c are mounted to the guide blocks 20a, 20b, 20c via brackets 29a, 29b, 29c. Nuts 30a, 30b, 30c of the ball screws 24 are fixedly secured to the wedge blocks 22a, 22b, 22c.

When the pulse motors 25a, 25b, 25c are driven, the wedge blocks 22a, 22b, 22c are moved in axial directions of the ball screws 24a, 24b, 24c. The wedge blocks 22a, 22b, 22c have flat contact surfaces 31a, 31b, 31c for contact with the rollers 19a, 19b, 19c. The contact surfaces 31a, 31b, 31c are each inclined by a fixed angle $\alpha$ with respect to the rotary shafts of the ball screws 24a, 24b, 24c.

The upper table 13 is provided with brackets 32, 33, 34, 35 and hook pins 36, 37, 38, 39, while the base plate 11 has hook pins 40, 41, 42, 43 fixed thereto. Tensile springs 44–47 are stretched between the hook pins 36–39 and 40–43, so that the rollers 19a, 19b, 19c are pressed to the contact surfaces 31a, 31b, 31c of the wedge blocks 22a, 22b, 22c by the tensile springs 45 and 47, 44, 46, respectively.

The wedge blocks 22a, 22b, 22c are arranged in the disposition as shown in FIG. 4. Specifically, the contact surface 31a of the wedge block 22a is set at right angles to the contact surfaces 31b, 31c of the other wedge blocks 22b, 22c. Moreover, the contact surface 31b of the wedge block 22b is in parallel to the contact surface 31c of the wedge block 22c via the upper table 13. At this time, a distance L between a line D perpendicular to the contact surface 31b and passing through a center of the roller 19b and a line E perpendicular to the contact surface 31c and passing through a center of the roller 19c is determined to be larger than 0.

Supposing that a direction parallel to the contact surface 31a is x, a direction perpendicular to the contact surface 31a is y, an angle defined by the contact surface 31a and the rotary shaft of the ball screw 24a is $\alpha$ ($\alpha = \sin^{-}(1/20)$), and a lead of the ball screw 24a is 2 mm, if the ball screw 24a is rotated 1/1000 of a turn by the pulse motor 25a, the wedge block 22a is moved 2 $\mu$m and the roller 19a is moved 0.1 $\mu$m in the y direction. The same goes true for the rollers 19b and 19c. Accordingly, as the rollers 19a, 19b and 19c are positioned in the above-depicted state, the upper table 13 is positioned with a resolving power of 0.1 $\mu$m in the x, y, and $\theta$ directions.

SUMMARY OF THE INVENTION

However, it is a drawback of the prior art that the ball screws 24a, 24b, 24c are expensive and thus increase costs. A projected area of the whole apparatus becomes disadvantageously large relative to an available stroke in the constitution as above, whereby the apparatus is bulky in structure. Moreover, a long time is required to move a predetermined stroke because of the use of the ball screws and a mechanical speed-reduction mechanism of a tapered cam system.

An object of the present invention is to provide a positioning table achieving low-cost and high-speed positioning in a small area.

In accomplishing these and other objects, according to one aspect of the present invention, there is provided a positioning table comprising:

a table member having a load plane;

a supporting device for movably supporting the table member within one plane parallel to the load plane;

first, second, and third slide blocks located around the table member in a freely movable fashion in directions close to and away from the table member, the first and second slide blocks moving in the directions parallel to each other, to which the third slide block moves in the direction perpendicular;

first, second, and third rollers projecting from a peripheral edge of the table member and rotatable about perpendicular axes to the one plane, the first, second, and third slide blocks being pressed in touch with the corresponding first, second, and third rollers; and first, second, and third rotary cams butting against the corresponding first, second, and third slide blocks at opposite sides to where the first, second, and third slide blocks are respectively in pressed in touch with the first, second, and third rollers.

According to another aspect of the present invention, there is provided the positioning table wherein the supporting device comprises:

a base plate for supporting the table member having the load plane on its upper surface;

a regulating device integrally fixed to a lower surface of the table member through the base plate, with having a regulating plate faced to the base plate at a lower end thereof; and balls interposed between the table member and the base plate and between the base plate and the regulating plate, whereby the base plate is held between the table member and the regulating plate via the balls.

According to a further aspect of the present invention, there is provided the positioning table, wherein the supporting device comprises:

a base plate for supporting the table member having the load plane on its upper surface;

a regulating device integrally fixed to a lower surface of the table member through the base plate, with having a regulating plate faced to the base plate at a lower end thereof;

balls interposed between the table member and the base plate; and an urging member for urging the table member to be pressed against the base plate via the balls.

According to a further aspect of the present invention, there is provided the positioning table, wherein the balls are so arranged that three balls are interposed and located 120° apart between the table member and the base plate.

According to a further aspect of the present invention, there is provided the positioning table wherein an outer peripheral surface of each of the rotary cams is so formed as to represent a uniform curve.

According to a further aspect of the present invention, there is provided the positioning table, further comprising an urging device for urging the table member so as to press the first, second, and third rollers in touch with the corresponding first, second, and third slide blocks.

According to a further aspect of the present invention, there is provided the positioning table, further comprising a controller for controlling operations of the rotary cams to regulate the table member to a desired position.

According to a still further aspect of the present invention, there is provided the positioning table, further comprising first, second, and third guide members for guiding movements of the first, second, and third slide blocks in respective directions.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1A:
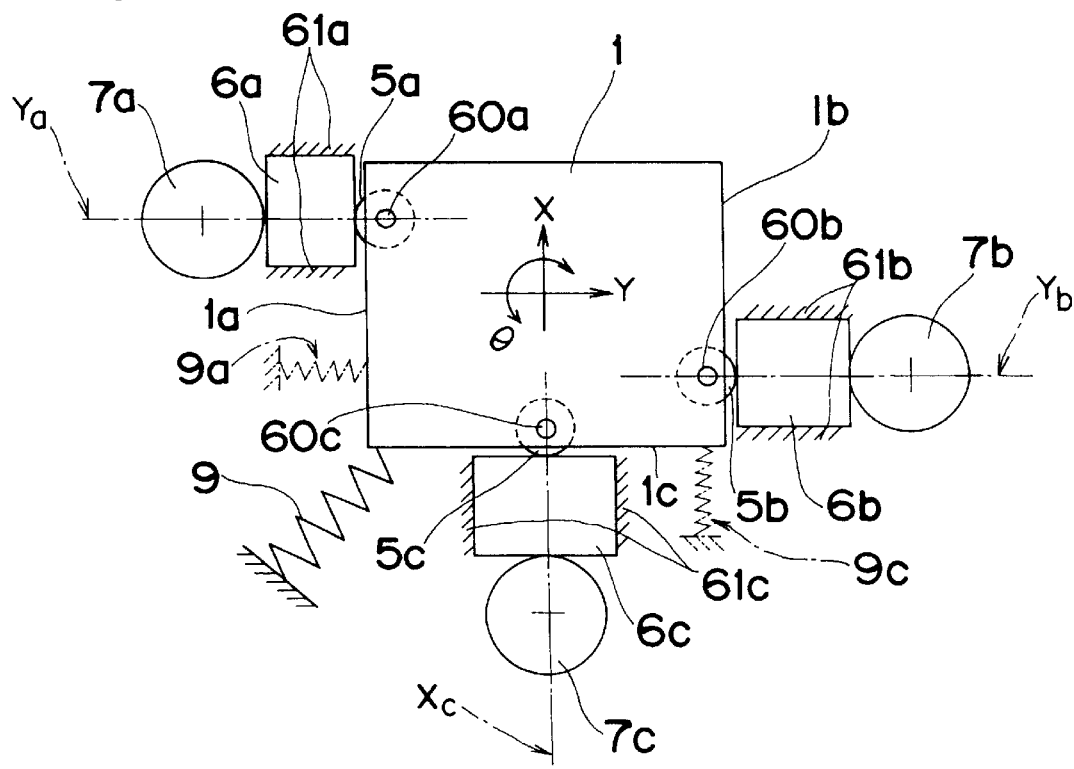
FIG. 1A is a plan view of a positioning table according to one embodiment of the present invention.

Before the description of the present invention proceeds, it is to be noted that like parts are designated by like reference numerals throughout the accompanying drawings.

A positioning table according to a preferred embodiment of the present invention will be described below with reference to FIGS. 1A, 1B, 2A, 2B, and 2C.

Reference numeral 1 is a rectangular table member disposed on a base plate 2 in a freely movable fashion. A regulating device 3 is integrally fitted at a lower surface of the table member 1 and penetrates the base plate 2. A regulating plate 3a is set at a lower end of the regulating device 3 via a shaft 3b thereof to face the table member 1 via the base plate 2. The shaft 3b of the regulating device 3 penetrates through a hole 2d of the base plate 2 so that the shaft 3b is movable within the hole 2d. Moreover, steel balls 4a and 4b are interposed between the table member 1 and the base plate 2 and between the base plate 2 and the regulating plate 3a, respectively. It is preferable that the steel balls 4a are located 120° apart and the steel balls 4b are located 120° apart. That is, it is preferable that the number of each of the balls 4a, 4b is equal to or more than three in order to stably support the table member 1. In other words, the base plate 2 is held between the table member 1 and the regulating plate 3a via the steel balls 4a and 4b, so that the table member 1 is supported by the base plate 2 to be freely movable within a plane parallel to a load plane thereof.

Figure 1B:
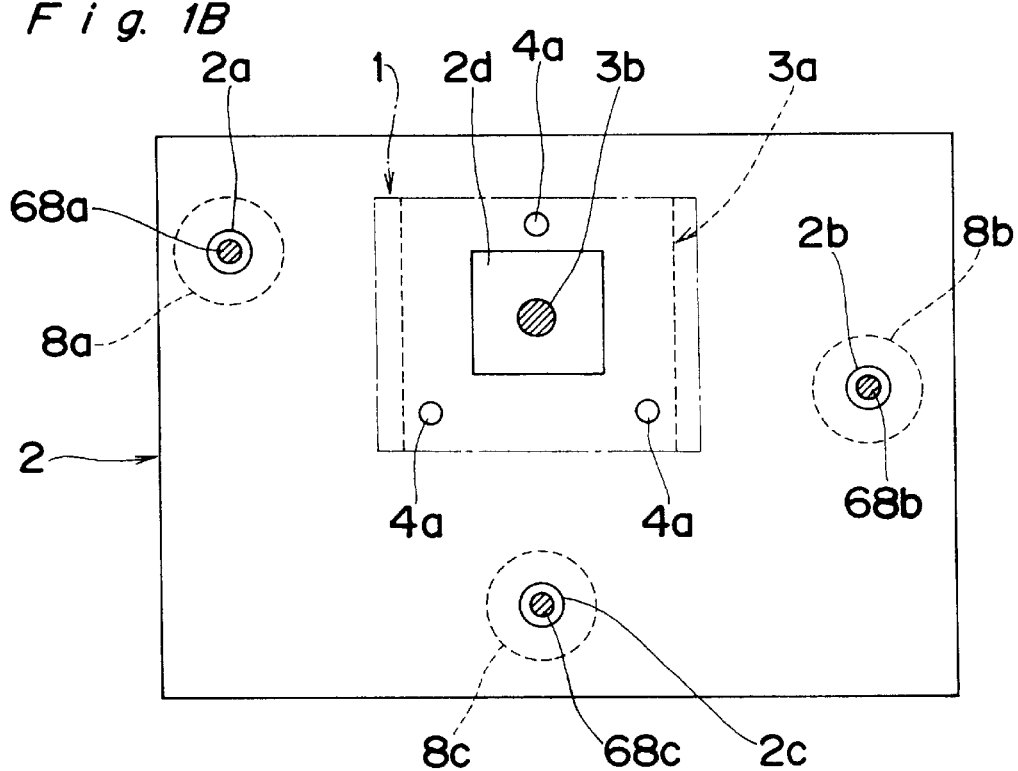
FIG. 1B is a sectional plan view of the positioning table.
Figure 2A:
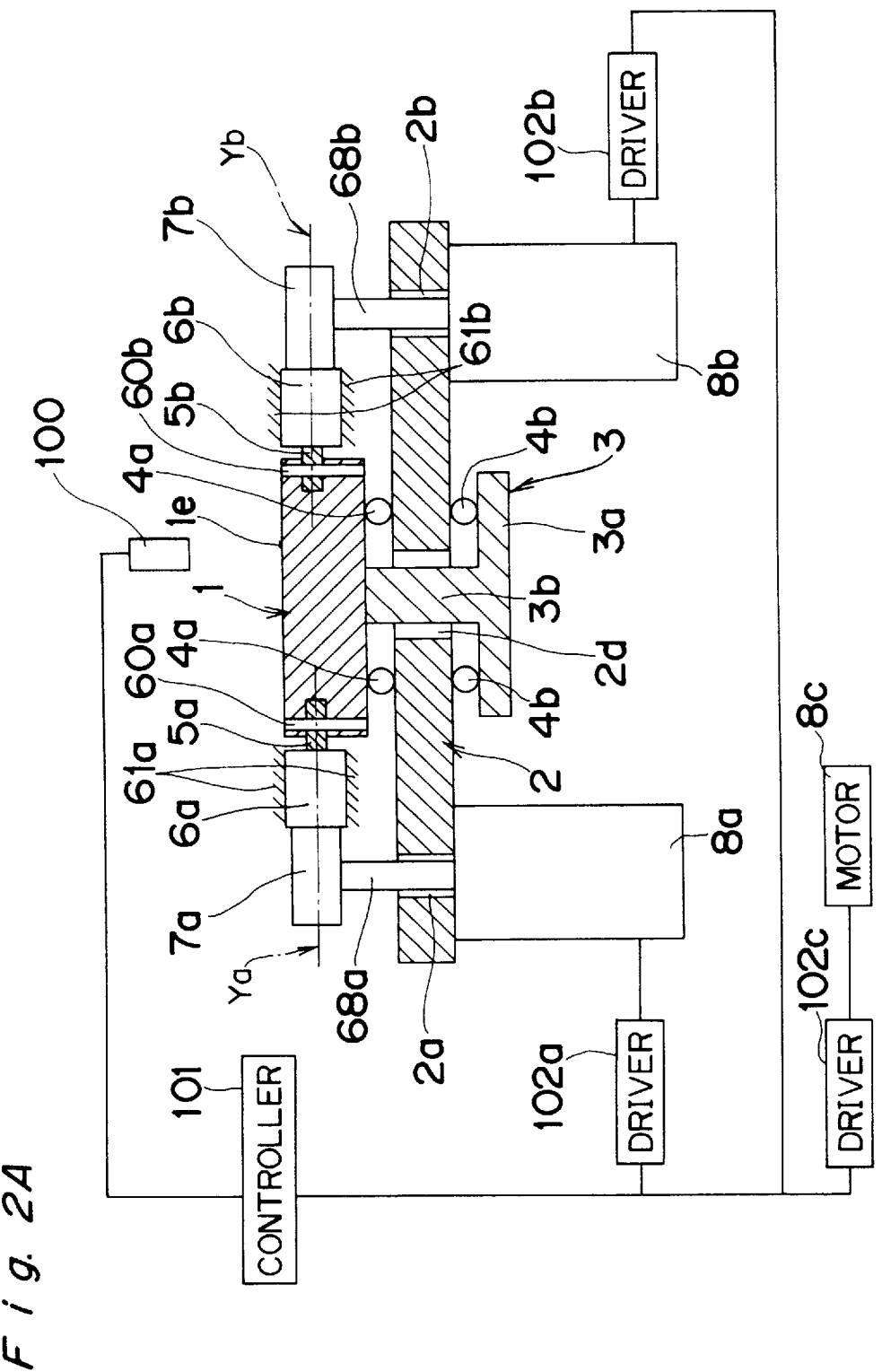
FIG. 2A is a longitudinal sectional view of the positioning table.

There are arranged rollers 5a, 5b, and 5c at three suitable points on three of four sides of an outer peripheral edge of the table member 1, and the rollers 5a, 5b, 5c are freely rotatable around shafts 60a, 60b, 60c. Slide blocks 6a, 6b, 6c are slidable in directions perpendicular to the three sides 1a, 1b, 1c of the outer peripheral edge of the table member 1 to be moved closer to or away from the table member 1 while being guided by liner guide members 61a, 61b, 61c. The slide blocks 6a, 6b, 6c are respectively brought in contact with the rollers 5a, 5b, 5c. Rotary cams 7a, 7b, 7c abut against the slide blocks 6a, 6b, 6c at an opposite side to where the slide blocks 6a, 6b, 6c are held in touch with the rollers 5a, 5b, 5c. The rotary cams 7a, 7b, 7c are directly coupled with rotary shafts 68a, 68b, 68c of corresponding motors 8a, 8b, 8c with the rotary shafts 68a, 68b, 68c being freely rotatable through holes 2a, 2b, 2c of the base plate 2 as shown in FIGS. 1A, 1B, 2A (8c is not shown in FIG. 2A). The centers of the roller shaft 60a and the rotary shaft 68a are located on the same axis Ya while the slide block 6a moves along the axis Ya as guided by the linear guide member 61a. The centers of the roller shaft 60b and the rotary shaft 68a are located on the same axis Yb parallel to the axis Ya while the slide block 6b moves along the axis Yb as guided by the linear guide member 61b. The centers of the roller shaft 60c and the rotary shaft 68c are located on the same axis Xc as guided by the linear guide member 61c. The axis Xc is perpendicular to the axes Ya and Yb axes.

In FIG. 2A, reference numeral 100 denotes a recognition camera for detecting a positional mark 1e on the table member 1 to recognize the position of the table member 1. 102a, 102b, 102c denote drivers for driving the motors 8a, 8b, 8c, and 101 denotes a controller for controlling the drivers 102a, 102b, 102c based on the recognition result and a desired position of the table member 1 where the table member 1 is to be moved.

Reference numeral 9 is a tensile spring urging the table member 1 so that the rollers 5a, 5b, 5c are urged into contact with the slide blocks 6a, 6b, 6c.

The positioning table in the above construction operates in the following manner.

Since the table member 1 is urged by the tensile spring 9 to be pressed to the rotary cams 7a, 7b, 7c via the rollers 5a, 5b, 5c and the slide blocks 6a, 6b, 6c, when the rotary cams 7a, 7b, 7c are rotated to an optional position by the motors 8a, 8b, 8c, the table member 1 is moved to an optional position in the x, y, and θ directions relative to the base plate 2, to be positioned thereat under the control of the controller 101. That is, for example, when the motor 8*a* rotates to move the slide block 6*a* by an amount in the right direction of the Y axis in FIG. 1A so as to push the table member 1 and the motor 8*b* rotates to move the slide block 6*b* by the same amount in the right direction of the Y axis so as to allow the table member 1 to move rightward, the table member 1 moves by the same amount in the right direction of the Y axis in FIG. 1A. At this time, the roller 60*c* rotates on the surface of the slide block 6*c*. When the motor 8*c* rotates to move the slide block 6*c* in the upward direction of the X axis against the urging force of the spring 9 so as to push the table member 1, the table member 1 moves upwardly in FIG. 1A by the movement of the slide block 6*c*. When the motor 8*c* rotates to move the slide block 6*c* in the downward direction of the X axis so as to be away from the table member 1, the table member 1 moves downward by the urging force of the spring 9. When the motors 8*a*, 8*b* rotate to move the slide blocks 6*a*, 6*b* by different amounts, the table member 1 rotates in the θ direction.

If an outer peripheral surface of each of the rotary cams 7*a*, 7*b*, 7*c* is designed to represent a uniform curve (Archimedes'spiral), it becomes possible to select a rotating angle and a shifting amount of each of the rotary cams 7*a*, 7*b*, 7*c* linearly. Since the base plate 2 is supported via the steel balls 4*a* and 4*b* interposed between the table member 1 and the regulating plate 3*a* united together, the table member 1 shows a high rigidity in all directions including a heightwise direction, other than moving directions and can be shifted with low friction as a whole because of the rolling friction in the moving directions.

As is discussed hereinabove, in the embodiment of the present invention, three points at the outer peripheral edge 1*a*, 1*b*, 1*c* of the table member 1 are driven by the rotary cams 7*a*, 7*b*, 7*c* via the rollers 5*a*, 5*b*, 5*c* and the slide blocks 6*a*, 6*b*, 6*c*. The table member 1 is positioned in directions of three axes in this manner. In comparison with the conventional construction using ball screw feed mechanisms and tapered cam mechanisms, the table member 1 can be positioned at high speeds within a predetermined moving range and the entire apparatus occupies a reduced smaller area.

Figure 3:
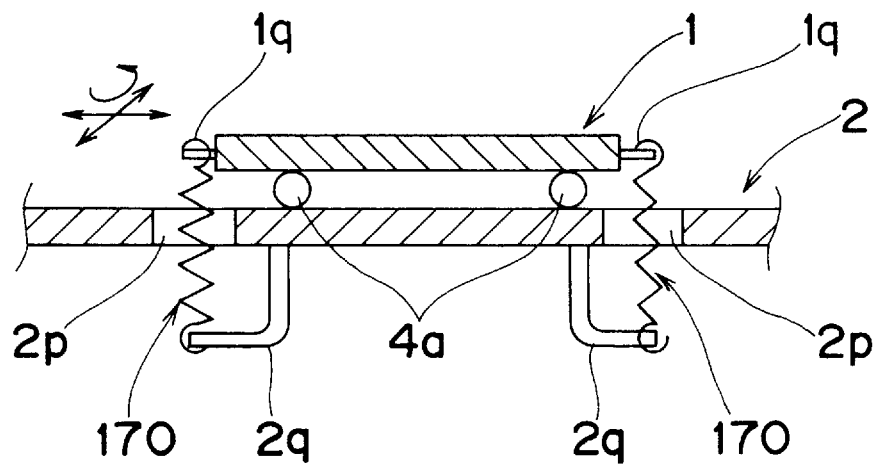
FIG. 3 is a sectional side view of a positioning table according to a further embodiment of the present invention.
Figure 4:
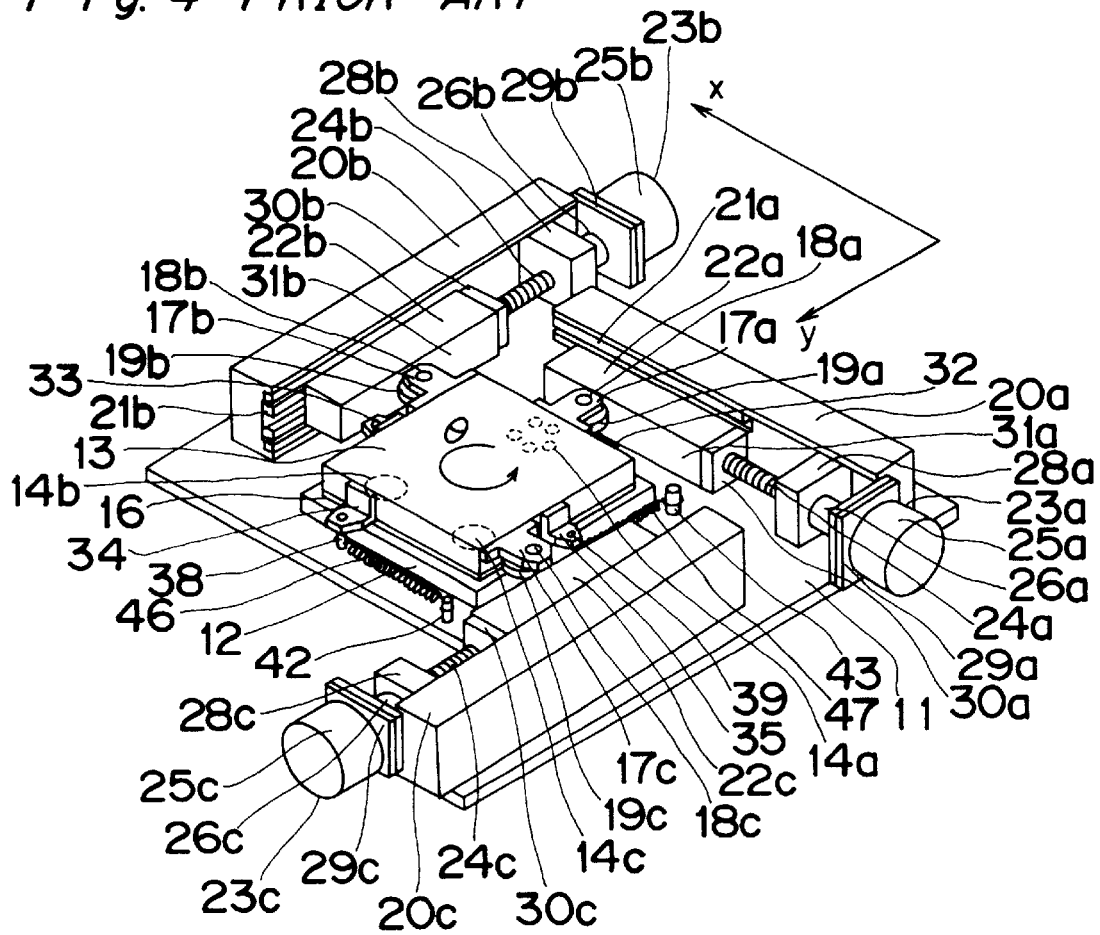
FIG. 4 is a perspective view of a conventional positioning table.
Figure 6:
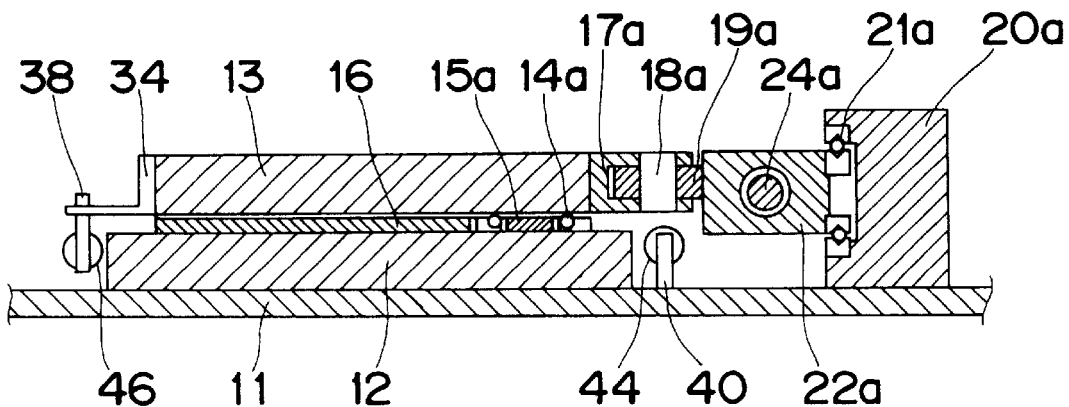
FIG. 6 is a longitudinal sectional view of the conventional positioning table.
Figure 5:
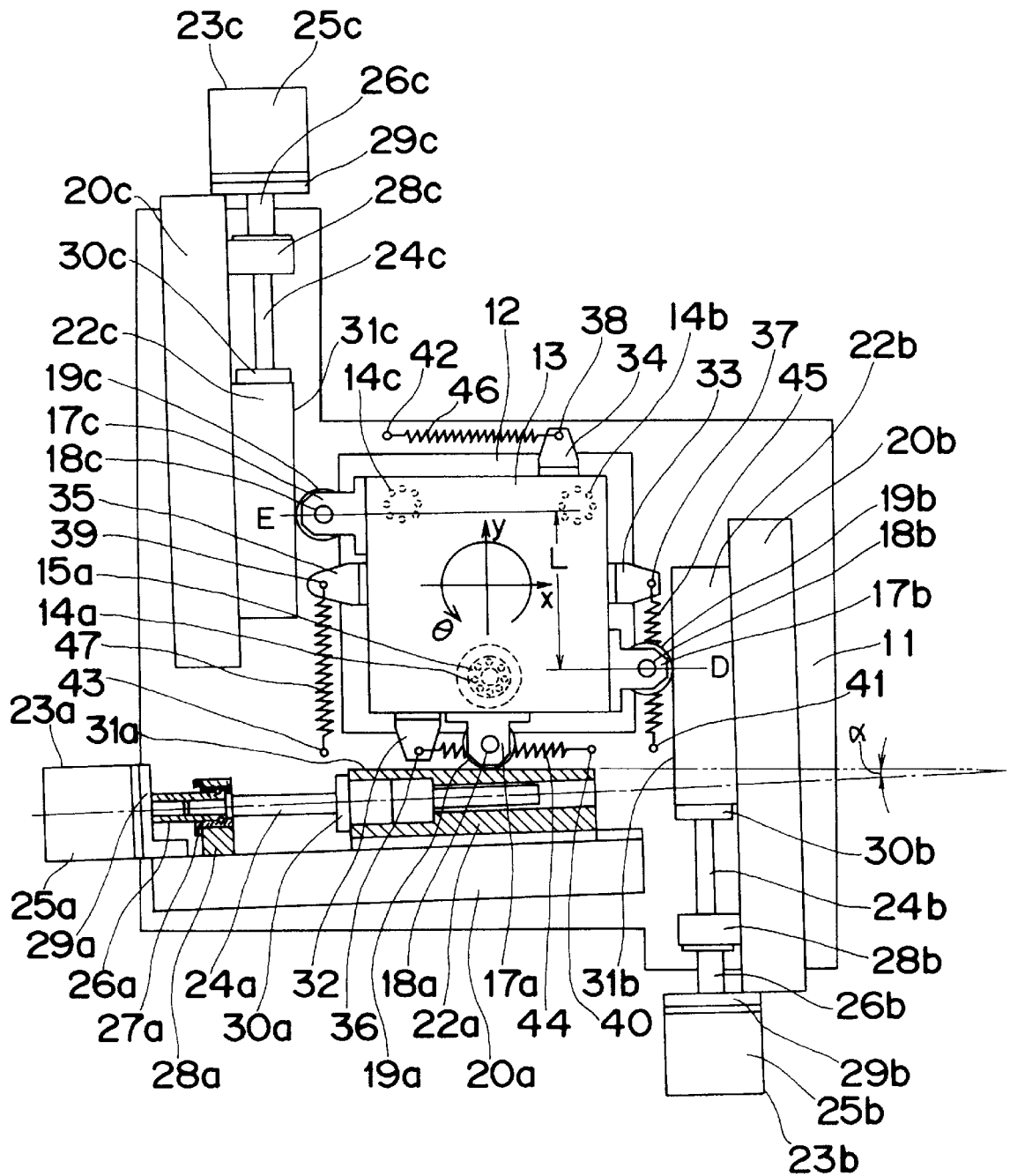
FIG. 5 is a plan view of the conventional positioning table.

FIG. 3 is a sectional side view of a positioning table according to a further embodiment of the present invention. In this embodiment, a spring mechanism shown in FIG. 3 can be used instead of the arrangement of the steel balls 4*b*. That is, in FIG. 3, the table member 1 has projections 1*q* at its side surfaces and the base plate 2 has L-shaped projections 2*q* corresponding to the projections 1*q*. Springs 170 are connected between the corresponding projections 1*q*, 2*q* through holes 2*p* and extend of the base plate 2 so that the table member 1 is urged into contact with the steel balls 4*a* on the base plate 2 by the urging forces of the springs 170. The projection 2*q* and the hole 2*p* are formed so as to allow the movement of the spring 170 in the hole 2*p* in accordance with the movement of the table member 1.

Figure 2B:
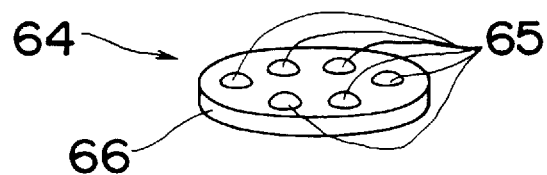
FIG. 2B is a perspective view of a bearing of the positioning table to according another embodiment of the present invention.
Figure 2C:
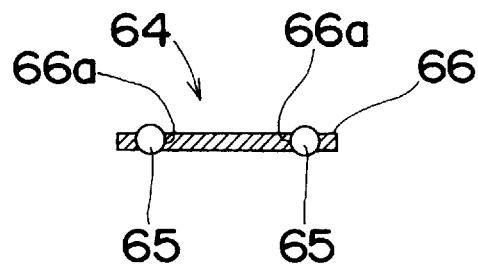
FIG. 2C is a sectional side view of the bearing of FIG. 2B.

Instead of each steel ball 4*a*, 4*b*, a bearing 64 can be used which has a plurality of balls 65 freely rotatable in holes 66*a* of a plate 66 as shown in FIGS. 2B and 2C. Also, instead of the tensile spring 9, two tensile springs 9*a*, 9*c* can be used which urge the table member 1 in the X and Y axes as shown by dotted lines in FIG. 1A and which has the same function as the spring 9. Each of the sides 1*a*, 1*b*, 1*c* can be formed in a curved surface although each of the sides 1*a*, 1*b*, 1*c* are shown as a flat surface in FIG. 1A. It is preferable that the surface of each slide block 6*a*, 6*b*, 6*c* which faces the table member 1 is formed as a flat surface with high accuracy.

The positioning table according to the present invention includes, as is made clear from the foregoing description, the table member having the load plane, supporting device for supporting the table member movably within one plane parallel to the load plane, three rollers arranged at the peripheral edge of the table member, slide blocks in pressing contact with the rollers in such a manner as to be movable toward and away from the table member, and rotary cams butting against the slide blocks. When the rotary cams are processed to be highly accurate with a small diameter, a projected area of the whole apparatus is reduced, and the apparatus is made compact and light-weight. A predetermined amount of movement is secured by one rotation of the rotary cam, thereby realizing high-speed positioning. Moreover, the parts are smaller in number and simple, hence reducing costs.

The supporting device is constituted to hold the base plate between the table member and the regulating plate via the steel balls or bearings. The table member is accordingly highly rigid against tensions and bends in any direction. Furthermore, since each of the rotary cams is formed into a shape to represent a uniform curve, the rotating angle and the shifting amount of each of the rotary cams are consequently linearly changed, whereby the rotary cams become easy to control.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A positioning table comprising:
   a table member having a load plane;
   a supporting device for movably supporting the table member within one plane parallel to the load plane;
   first, second, and third slide blocks located around the table member in a freely movable fashion toward and away from the table member, the first and second slide blocks being movable in first and second directions parallel to each other, and the third slide block being movable in a third direction perpendicular to said first and second directions;
   first, second, and third rollers projecting from a peripheral edge of the table member and being rotatable about axes perpendicular to said one plane, the first, second, and third slide blocks being pressed into contact with first sides of the corresponding first, second, and third rollers; and
   first, second, and third rotary cams abutting against the corresponding first, second, and third slide blocks at sides thereof opposite to said first sides thereof;
   wherein the supporting device comprises: a base plate for supporting the table member having the load plane on its upper surface, a regulating device integrally fixed to a lower surface of the table member through the base plate and having a regulating plate facing the base plate at a lower end thereof, and balls interposed between the table member and the base plate and between the base plate and the regulating plate, wherein the base plate is held between the table member and the regulating plate via the balls.

2. The positioning table according to claim 1, wherein the balls are so arranged that three balls are interposed and located 120° apart between the table member and the base plate and three balls are interposed and located 120° apart between the base plate and the regulating plate.

3. The positioning table according to claim 2, wherein an outer peripheral surface of each of the rotary cams is formed as to represent a uniform curve.

4. The positioning table according to claim 3, further comprising an urging device for urging the table members so as to press the first, second, and third rollers into contact with the corresponding first, second, and third slide blocks.

5. The positioning table according to claim 4, further comprising a controller for controlling operations of the rotary cams to regulate movement of the table member to a desired position.

6. The positioning table according to claim 4, further comprising first, second, and third guide members for guiding movements of the first, second, and third slide blocks in the first, second, and third directions.

7. The positioning table according to claim 1, further comprising an urging device for urging the table member so as to press the first, second, and third rollers into contact with the corresponding first, second, and third slide blocks.

8. The positioning table according to claim 1, further comprising a controller for controlling operations of the rotary cams to regulate movement of the table member to a desired position.

9. The positioning table according to claim 8, further comprising first, second, and third guide members for guiding movements to the first, second, and third slide blocks in the first, second, and third direction, respectively.

10. The positioning table according to claim 1, further comprising first, second, and third guide members for guiding movements of the first, second, and third slide blocks in the first, second and third directions, respectively.

11. A positioning table comprising:

a table member having a load plane;

a supporting device for movably supporting the table member within one plane parallel to the load plane;

first, second, and third slide blocks located around the table member in a freely movable fashion toward and away from the table member, the first and second slide blocks being movable in first and second directions parallel to each other, and the third slide block being movable in a third direction perpendicular to said first and second directions;

first, second, and third rollers projecting from a peripheral edge of the table member and being rotatable about axes perpendicular to said one plane, the first, second, and third slide blocks being pressed into contact with first sides of the corresponding first, second, and third rollers; and first, second, and third rotary cams abutting against the corresponding first, second, and third slide blocks at sides thereof opposite to said first sides thereof;

wherein the supporting device comprises: a base plate for supporting the table member having the load plane on its upper surface, a regulating device integrally fixed to a lower surface of the table member through the base plate and having a regulating plate facing the base plate at a lower end thereof, balls interposed between the table member and the base plate, and an urging member for urging the table member to be pressed against the base plate via the balls.

12. The positioning table according to claim 11, wherein the balls are so arranged that three balls are interposed and located 120° apart between the table member and the base plate.

13. The positioning table according to claim 12, wherein an outer peripheral surface of each of the rotary cams is so formed as to represent a uniform curve.

14. The positioning table according to claim 13, further comprising an urging device for urging the table member so as to press the first, second, and third rollers into contact with the corresponding first, second, and third slide blocks.

15. The positioning table according to claim 14, further comprising a controller for controlling operations of the rotary cams to regulate movement of the table member to a desired position.

16. The positioning table according to claim 14, further comprising first, second, and third guide members for guiding movements of the first, second, and third slide blocks in the first, second, and third directions, respectively.

17. The positioning table according to claim 11, further comprising an urging device for urging the table member so as to press the first, second, and third rollers into contact with the corresponding first, second, and third slide blocks.

18. The positioning table according to claim 11, further comprising a controller for controlling operations of the rotary cams to regulate movement of the table member to a desired position.

19. The positioning table according to claim 18, further comprising first, second, and third guide members for guiding movements of the first, second, and third slide blocks in the first, second, and third directions, respectively.

20. The positioning table according to claim 11, further comprising first, second, and third guide members for guiding movements of the first, second, and third slide blocks in the first, second and third directions, respectively.

* * * * *